(No Model.)
J. P. COGHLIN.
JUNCTION BOX COUPLING FOR ELECTRIC WIRE CONDUITS.
No. 581,064. Patented Apr. 20, 1897.
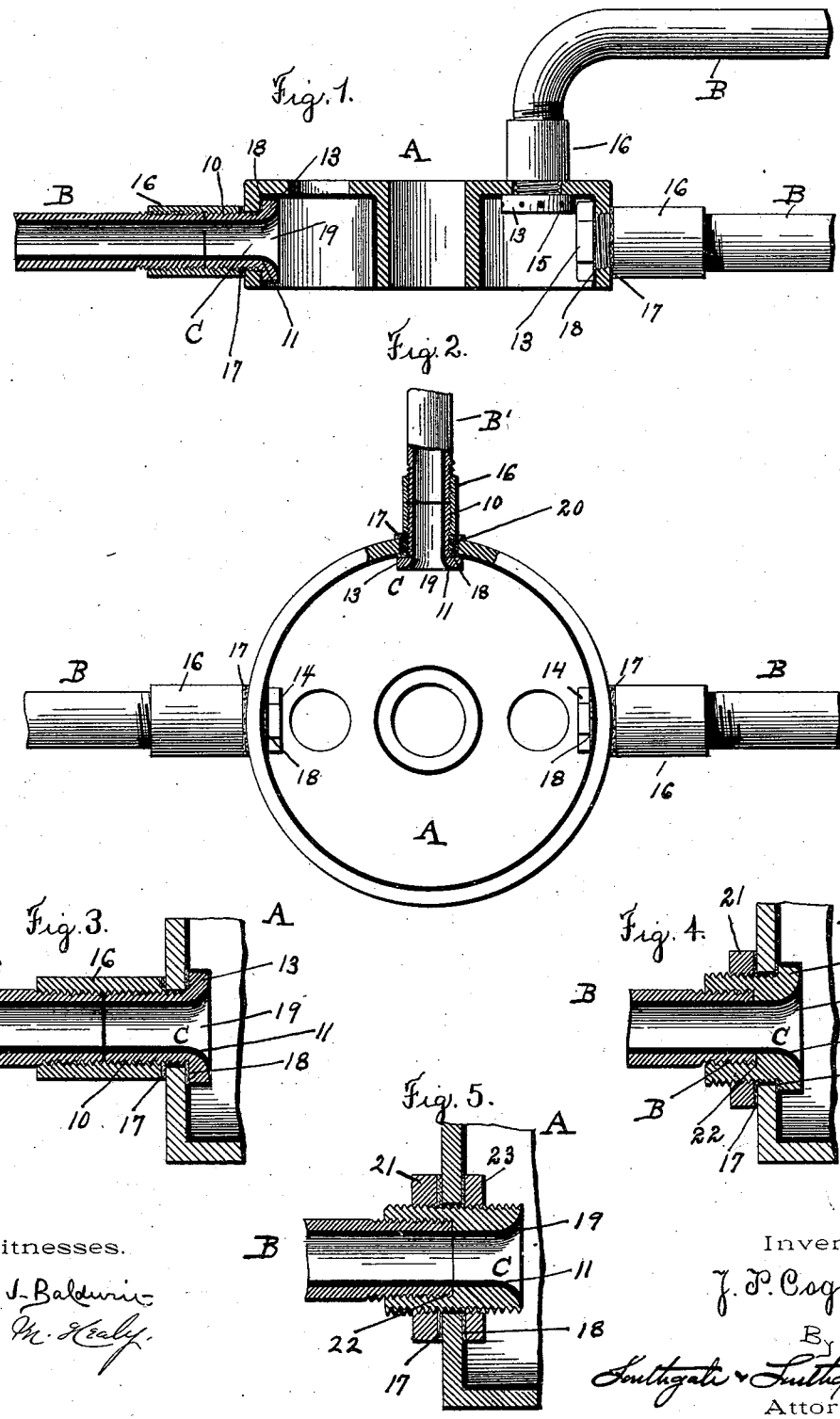
Witnesses.
W. J. Baldwin
E. M. Healy
Inventor.
J. P. Coghlin
By
Southgate & Southgate
Attorneys.

UNITED STATES PATENT OFFICE.

JOHN P. COGHLIN, OF WORCESTER, MASSACHUSETTS.

JUNCTION-BOX COUPLING FOR ELECTRIC-WIRE CONDUITS.

SPECIFICATION forming part of Letters Patent No. 581,064, dated April 20, 1897.

Application filed February 8, 1897. Serial No. 622,479. (No model.)

*To all whom it may concern:*

Be it known that I, JOHN P. COGHLIN, a citizen of the United States, residing at Worcester, in the county of Worcester and State of Massachusetts, have invented a new and useful Improvement in Junction-Box Couplings for Electric-Wire Conduits, of which the following is a specification.

The object of this invention is to provide an improved coupling for attaching electric-wire conduits to junction-boxes which shall be very simple, of low cost, and which can be very easily and quickly applied.

To this end my invention consists of the parts herein described and claimed, and illustrated in the accompanying drawings, in which—

Figure 1 is a sectional elevation illustrating how my improved coupling may be used to secure a number of conduits to a junction-box. Fig. 2 is a bottom plan view of the parts shown in Fig. 1. Fig. 3 is an enlarged sectional view of the preferred form of coupling; and Figs. 4 and 5 are views similar to Fig. 3, illustrating modifications hereinafter referred to at length.

The ordinary junction-box for electric-wire conduits consists of a box of any desired shape, projecting from which are hollow screw-threaded nipples or arms, to which the conduits or pipes are to be attached. This form of box is exceedingly difficult to place in position for the reasons, first, that the pipes can only be led to said box in the directions in which said screw-threaded arms project, and therefore a special box is required for each location, and, second, it is extremely difficult to put the box in place, as the pipes have to be sprung to one side or the junction-box set in position with the pipes, and both these operations necessitate the placing of the junction-box in position at the same time with the pipes, which is very objectionable, as the pipes are generally placed in a building before the same is finished, and the junction-box if in position during the finishing operation is very apt to be broken or defaced.

By my invention I provide a junction-box which has plain sides, and I use for a coupling a coupling-bushing exteriorly threaded and preferably interiorly insulated, which bushing preferably has a head which is squared or which has spanner-holes, so that the bushing can be screwed into the conduit or coupling thereon from the interior of the junction-box. By this arrangement I can place the pipes or conduits in a building and leave a block of wood between them while the building is being finished, or simply leave the pipes projecting to the points that they will occupy on the junction-box. Then thereafter I can slide my junction-box in between the ends of the conduits or pipes, insert the coupling-bushings in the interior of the junction-box, and screw them out into the conduits or pipes, which can be done in a very short time as compared with the ordinary practice.

My new way of attaching the conduits is very advantageous, as the junction-boxes can be placed in position or taken out at any time.

Referring to the drawings and in detail, A designates a junction-box which may be circular, square, or of any desired shape. The same is made with plain sides and has its interior insulated, as indicated in heavy lines.

B B B B' indicate the conduits or pipes for the electric wires, and may be of the ordinary pattern, consisting of light wrought-iron pipes interiorly insulated. These pipes are brought up to the position they will finally occupy. Thereafter the junction-box is slipped in between the ends of the pipes.

C designates my improved coupling-bushing. The same is exteriorly screw-threaded, as shown at 10, and interiorly insulated, as at 11, which insulation may consist either of a coating of porcelain or other insulating compound or of a thin bushing of fiber inserted into the main bushing. The said bushing also has a head 13, which may be made in the form of a nut, as indicated at 14 in Fig. 2, or which may have spanner-holes, as indicated at 15 in Fig. 1. Couplings 16 are preferably placed on the ends of the pipes or conduits when they are placed in position. Small washers, as 17, are preferably placed between the ends of the coupling 16 and the junction-box, and also preferably fitted onto the coupling-bushings to bear on the under side of the head are washers or gaskets 18.

To couple the conduit tightly to the junction-box, all that is necessary is to put the bushing into the inside of the junction-box and push it outwardly through a hole, which can be bored or formed in the side of the junction-box wherever a pipe or conduit is to join the junction-box. The bushing is then turned so that the same will screw into the coupling 16, and this will draw the coupling up tightly against the side of the box and will rigidly secure the conduit to the box. The coupling 16 engaging the outer side of the box and the head 13 of the coupling-bushing the inside of the box, the pipe or conduit will be securely attached to the box. The coupling is given a rounded corner, as at 19, so that the wires can be readily drawn through the same. By this connection the conduits can be very quickly and easily attached to the junction-box.

The junction-boxes can be made in large quantities, and holes drilled or punched through the sides or bottom of the same in whatever direction it is desired to join a conduit thereto.

Sometimes it is desired to use different-sized pipes. For example, in Fig. 2 the pipe B' is represented as smaller than the pipes B B. One simple arrangement to accomplish this end is to make all the holes in the junction-box of the same size and to use a small bushing-ring 20 on the outside of the coupling-bushing.

In Fig. 4 I have shown a modification in which instead of using a coupling on the end of the conduit I screw the coupling-bushing on the end of the pipe B up to a shoulder 22 and screw a nut 21 on the outside of the coupling-bushing. In Fig. 5 substantially the same construction is represented, except that instead of using a head on the coupling-bushing a nut 23 is screwed thereon.

I have found in practice that by the use of my invention I can very quickly couple the junction-box in place at any desired time.

In some cases I intend omitting the insulation from the inside of the coupling-bushing, as it may be the practice in some cases to provide the wires with an extra insulation instead of having insulation on the interior of the pipes, couplings, and junction-boxes. If this practice is followed, my coupling-bushing being located on the inside will permit the wires to be readily drawn therethrough without abrasion to their insulation.

The details herein described may be greatly varied by a skilled mechanic without departing from the scope of my invention as expressed in the claims.

Having thus fully described my invention, what I claim, and desire to secure by Letters Patent, is—

1. The combination in a junction-box for electric conduits, of a coupling for attaching the conduit thereto, consisting of a hollow coupling-bushing exteriorly screw-threaded, and interiorly smooth, substantially as described.

2. The combination with a junction-box for electric conduits, of a coupling for attaching the conduit thereto, consisting of a coupling-bushing exteriorly screw-threaded and interiorly insulated, substantially as described.

3. The combination with a junction-box for electric conduits, of a coupling for attaching the conduit thereto, consisting of a coupling-bushing exteriorly threaded and interiorly insulated, and having a head so that the bushing can be screwed to the conduit from the inside of the box, substantially as described.

4. The combination with a junction-box for electric conduits, a conduit or pipe having a coupling as 16 on the end thereof, a coupling-bushing exteriorly screw-threaded and interiorly insulated, having a head and adapted to be screwed into said coupling 16 from the interior of the box, so that the coupling 16 will be drawn tightly against the outside of the box, and the head of the bushing will engage the inside of the box, and thereby tightly connect the conduit to the junction-box, substantially as described.

5. As an article of manufacture, a coupling-bushing for attaching electric conduits to junction-boxes, comprising a headed hollow bushing having a smooth or insulated interior, substantially as described.

6. As an article of manufacture, a coupling-bushing for attaching electric conduits to junction-boxes, comprising a bushing exteriorly screw-threaded and interiorly insulated, substantially as described.

7. As an article of manufacture, a coupling for attaching an electric conduit to a junction-box, consisting of a coupling-bushing exteriorly screw-threaded, and interiorly insulated, and having a head so that the bushing can be screwed to the conduit from the inside of the box, substantially as described.

In testimony whereof I have hereunto set my hand in the presence of two subscribing witnesses.

JOHN P. COGHLIN.

Witnesses:
  LOUIS W. SOUTHGATE,
  PHILIP W. SOUTHGATE.